April 1, 1952 R. R. KILIAN 2,591,160
ROLLER BEARING AND MANUFACTURE THEREOF
Filed Dec. 1, 1947 3 Sheets-Sheet 2

INVENTOR.
Rudolph R. Kilian
BY
Marechal & Beebel
ATTORNEYS

Patented Apr. 1, 1952

2,591,160

UNITED STATES PATENT OFFICE 2,591,160

ROLLER BEARING AND MANUFACTURE THEREOF

Rudolph R. Kilian, Baldwinsville, N. Y., assignor to Rollway Bearing Company, Inc., Syracuse, N. Y., a corporation of New York Application December 1, 1947, Serial No. 788,987

5 Claims. (Cl. 308—217)

This invention relates to roller bearings, and more particularly to retainers for the rollers of a roller bearing and to methods of making such retainers.

One of the principal objects of the invention is to provide a retainer or cage for use in a roller bearing which is light in weight, which will afford effective guiding of the rollers for a prolonged useful life, and which is adapted for ready and economical quantity manufacture.

Another object is to provide a roller bearing retainer formed of relatively light and thin sheet metal in such manner and with such configuration as to possess high strength and rigidity in use while at the same time its weight is so low as to minimize the centrifugal forces effective thereon in use.

An additional object is to provide a roller bearing retainer which is so formed from a strip of sheet metal stock that its ends will readily autogenously weld together without the formation of an objectionable welding bead requiring a further removal treatment or operation.

It is also an object of the invention to provide a method of manufacturing roller bearing retainers from a strip of sheet metal of desired width which is simple and inexpensive to carry out and which will result in the production of retainers of highly accurate shape and size.

A further object is to provide such a method including a hardening treatment and a subsequent forming operation which imparts desired rigidity to the retainer and at the same time both counteracts deformations such as may occur during the hardening treatment and also assures adequate strength in the retainer and particularly in the welded joints therein.

Another object is to provide apparatus for use in producing retainers for roller bearings with speed and high accuracy by successively punching and forming receiving pockets for rollers in an advancing strip of sheet stock and periodically cutting off blanks of the proper length for rounding to cylindrical shape and welding to form a bearing retainer.

Still another object is to provide a method of fabricating roller bearing retainers from sheet metal stock by means of which the ends of a strip of stock are readily welded together to give a retainer of accurately predetermined cylindrical shape and size without the formation of an objectionable welding bead requiring subsequent removal.

Other objects and advantages of the invention will be apparent from the following description, the accompanying drawings and the appended claims.

In roller bearings of the type to which the present invention relates, the retainer or cage serves two important functions. It maintains the rollers in proper angularly spaced relation, and it guides the individual rollers in proper alignment parallel to the axis of the bearing. This latter function is of particular importance for minimum friction in the bearing as a whole. If the rollers are not accurately guided, they may wobble or cock at an angle to the bearing axis instead of running true, and when this happens the rollers tend to drag in the bearing races and thus give rise to objectionable friction and wear of themselves and also of the retainer and the races. Furthermore, as the guiding pockets in the retainer are thus subjected to increased wear and grow larger in use, there is a tendency on the part of the retainer itself towards eccentric movement in the bearing, which may tend to make the situation progressively worse.

It is accordingly highly desirable to construct the retainer in such manner as to provide guiding surfaces of substantial area for the roller and thus to distribute any wear or abrasive action present in the bearing over as wide an area as possible and to prevent concentration of wear in a limited area. This will in turn provide for long resistance to wear and thus assure that the rollers will be maintained in proper alignment for a long useful life of the bearing. The present invention provides a bearing retainer affording these advantages in operation and which in addition has substantial advantages from the standpoint of manufacturing procedure and cost.

Figure 1:
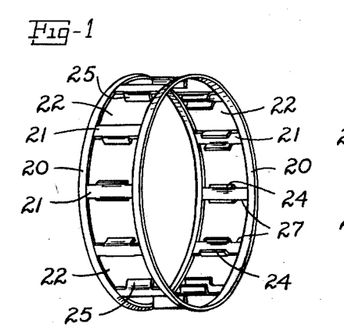
Fig. 1 is a view in perspective of a roller bearing retainer constructed in accordance with the present invention.

Referring to the drawings, which illustrate a preferred embodiment of the invention, Fig. 1 shows a roller bearing retainer constructed in accordance with the invention and comprising a pair of coaxial but axially spaced annular rim portions 20 and a plurality of circumferentially spaced integral web portions 21 connecting the rim portions and cooperating therewith to form a plurality of pockets 22 for the reception of rollers. As shown in Fig. 1, and also in Fig. 3, the web portions 21 extend substantially parallel to the central axis of the retainer, but the rim portions 20 are flared outwardly with respect to the web portions 21 through a relatively small angle, for example an angle of the order of substantially 15°. In addition, and referring particularly to Figs. 1 and 4, the web portions 21 have lips 24 formed inwardly thereof to provide guiding surfaces 25 for the rollers 26 in the adjacent pockets 22. These lips are spaced inwardly from the outer ends of the web portions, as indicated at 27, and their guiding surfaces 25 are curved about a radius substantially equal to the radius of the rollers to provide a substantial surface area for guiding engagement with each roller.

Figure 2:
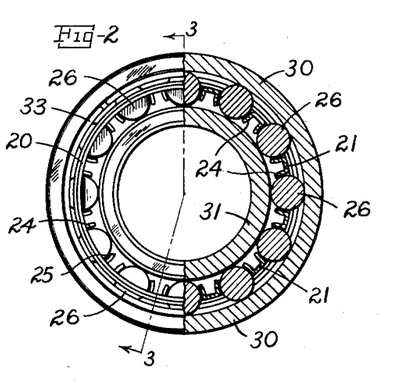
Fig. 2 is a view of a complete roller bearing including a retainer constructed as shown in Fig. 1, the view being half in end elevation and half in transverse section substantially on the line 2—2 of Fig. 3.
Figure 3:
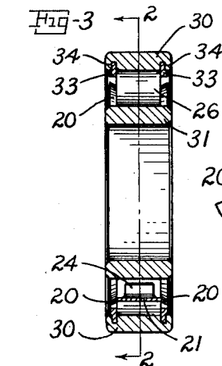
Fig. 3 is a view in longitudinal section taken substantially on the line 3—3 of Fig. 2.
Figure 4:
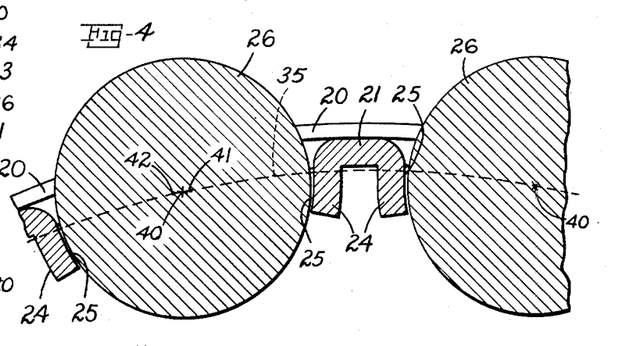
Fig. 4 is an enlarged detail view in section of a fragment of Fig. 2.

Figs. 2 and 3 show a complete roller bearing provided with a retainer constructed as described. This bearing includes an outer race 30 and an inner race 31 separated by the retainer and the rollers 26, the radial distance between the two races being substantially equal to the diameter of one of rollers 26. The retainer and rollers are held in position axially of the races by means such as split rings 33 engaged in complementary retaining grooves 34 in the inner surface of the outer race 30, as shown in Fig. 3. The retainer is preferably of such diameter, as shown in Figs. 2 and 4, that a circle having its center at the axis of a bearing and passing through the centers of the rollers, as indicated by the dotted arc 35 in Fig. 4, will also pass through or closely adjacent the web portions 21. With this arrangement, the guiding surfaces 25 of lips 24 will be located primarily and substantially completely below this central circle 35 and will thus be in position to exert a highly effective guiding action on the rollers.

The dimensions of the pockets 22 in the retainer are such as to provide predetermined running clearance for each roller in its pocket 22 and particularly between its pair of guiding lips. Referring to Fig. 4, it has been found that satisfactory results from this standpoint are obtained by curving each guiding surface 25 about a radius equal to that of the roller 26 guided thereby and with its center of curvature located on the central circle 35 of the bearing but spaced by a small amount, for example, .005 inch, from the center of the roller when the roller is positioned equidistantly from its pair of guiding surfaces. Thus referring to Fig. 4, the point 40 represents a point on the axis of roller 26, and the points 41 and 42 represent points on the axes of curvature of the guiding surfaces 25 adjacent the roller on its clockwise and counterclockwise sides, respectively, as viewed in Fig. 4. With the roller centrally positioned between its two guiding surfaces, as shown in Fig. 4, the portions of the arc 35 between point 40 and point 41 and between point 40 and point 42 will each subtend a chord of substantially .005 inch in length, the spacing of the points on the drawing being somewhat exaggerated for better illustration.

It will accordingly be seen that in use, the roller 26 will have sufficient freedom of movement between its guiding surfaces 25, as thus determined by the relative spacing of points 41 and 42, to provide running clearance adequate to avoid binding or other frictional contact, and at the same time, this clearance is not so great as to permit appreciable angular movement of the roller, which is thus properly guided in the desired parallel relation with the bearing axis. In addition, each pocket 22 is proportioned to provide limited axial clearance for the rollers sufficient to compensate for manufacturing errors but not enough to give rise to undue axial movement of the rollers. For example, in single width bearings, this clearance may be of the order of .006 to .008 inch at each end of the roller, and in so-called double width bearings, employing rollers of approximately twice the usual length, this clearance may be substantially .010 inch at each end of the roller.

A retainer of the construction described and shown in Figs. 1 to 4 may be readily and satisfactorily produced from comparatively light and inexpensive sheet metal stock without sacrificing the desired rigidity and guiding action in use. In general the thickness of the stock depends upon the size of the retainer, thinner stock being suitable for small sizes, and an example of a satisfactory material is a low carbon, cold rolled, 17-gage steel substantially .855 inch in width for a bearing having fifteen rollers each .500 inch in diameter and .565 inch in length arranged with their centers on a circle of approximately 3.35 inches in diameter.

Figures 5, 6, 7, 8, 9:
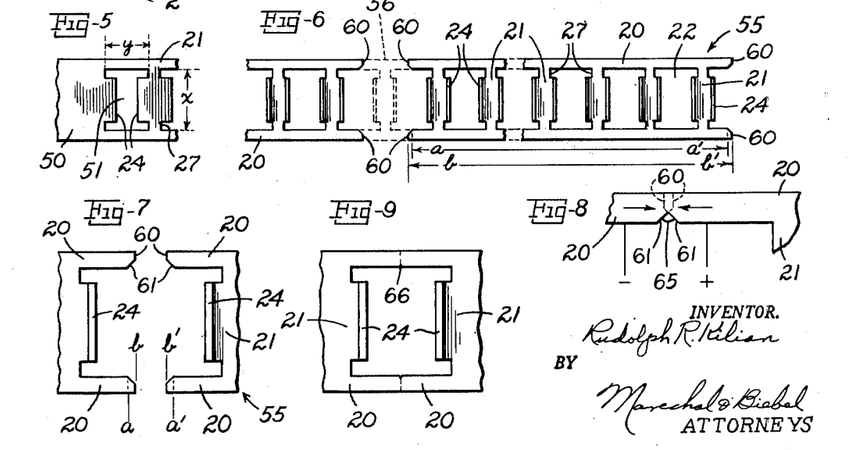
Figs. 5 and 6 are elevational views illustrating the formation of the blank from which the retainer of the invention is made.
Fig. 7 is an enlarged detail view of the ends of the blank shown in Fig. 6 prior to welding.
Fig. 8 is an enlarged fragmentary view illustrating an intermediate stage of the welding operation.
Fig. 9 is a view similar to Fig. 7 illustrating the ends of the blank after they have been welded together.
Figure 10:
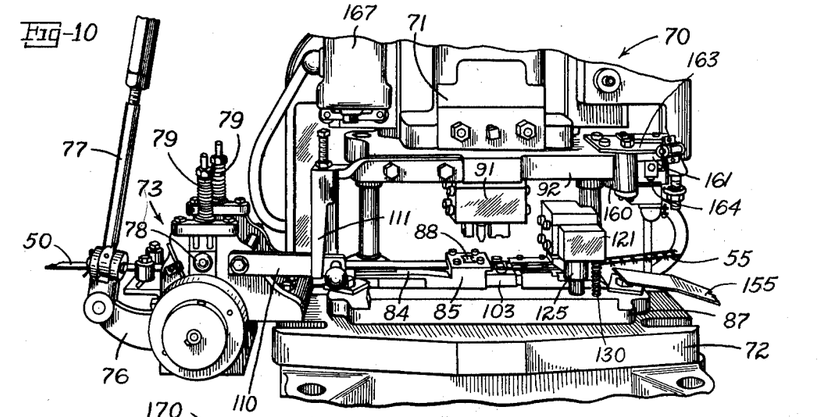
Fig. 10 is a view in perspective illustrating apparatus for producing the blank shown in Fig. 6.

Figs. 5 to 8 illustrate different stages in the manufacture of a retainer of the construction shown in Fig. 1. Referring first to Fig. 5, a strip 50 of sheet stock of the desired thickness and width may be fed through a progressive die of a punch press or other forming machine, as illustrated in Fig. 10, which first punches out spaced I-shaped holes therein, as indicated at 51 in Fig. 5, to form the desired rim portions 20 and web portions 21, but with the lips 24 on the webs still in the plane of the strip. For a bearing and rollers of the above respective sizes, suitable dimensions for each of these I-shaped holes are .580 inch for the distance $x$ in Fig. 5 and .540 inch for the distance $y$ in Fig. 5, with each lip 24 being substantially .360 inch measured laterally of the strip and .095 inch measured longitudinally of the strip to assure guiding surfaces of substantial area for the rollers. After the punching operation, the lips are formed out of the plane of the strip to the desired curvature already described in connection with Fig. 4, which may readily be done in a further operation of a progressive die.

When the desired number of pockets have been punched and formed for a retainer of predetermined size, a blank of the proper length is severed from the strip, such a blank being illustrated at 55 in Fig. 6. This blank is then formed to a substantially cylindrical shape, thus bringing the ends of each of its rim portions 20 into abutting contact, and these abutting ends 60 are butt welded autogenously as by application of pressure and electric current. It will be apparent that during this operation, a certain amount of metal is lost from the rim ends 60 as the result of the welding operation, and also that the rim portions flow into each other to a certain degree and thus reduce the circumference of the retainer as compared with its circumference before welding. To compensate for this loss in circumference, the shearing operation is so controlled as to leave the rim portions of each blank 55 in predetermined excess of the desired final circumference of the retainer, thus providing excess metal to be used during welding.

Referring to Fig. 6, the severing operation is carried out after the number of web portions blanked and formed adjacent the leading end of the strip is greater by one than the number of pockets to be provided in the completed retainer. Also, the severing operation is carried out simultaneously at either side of the last web portion 56 of this counted group and at points substantially equally spaced from the web portion 56, thus cutting this web portion wholly out of the strip and leaving the resulting severed rim portions extending at each end of the blank beyond the adjacent web portions. However, the severing operation does not take place at points equidistantly spaced between the web portion 56 and the web portions adjacent thereto on either side but instead is carried out at points closer to the web portion 56, thus providing the desired excess length in each of the resulting exposed ends 60 of the rim portions 20.

Satisfactory results from the standpoint of securing the desired final accuracy in the circumference of the retainer have been obtained by controlling the excess length in the blank to an amount at each end of the rim portion substantially equal to the thickness of the strip stock. This is illustrated in Fig. 6, wherein the distance $a-a'$ represents the desired circumference of the finished retainer to be formed from the blank 55, but it will be noted that the total length of the blank is equal to the distance $b-b'$, leaving at each end of the blank a length of stock $a-b$ and $a'-b'$ which is substantially equal to the thickness of the stock 50. Thus the combined lengths of the projecting end portions of each rim portion 20 of the blank will be greater than each length of rim portion between adjacent web portions in the blank, the additional material being furnished from the portions of each rim adjacent the web portion 56 which is cut out of the strip.

When the abutting ends 60 of the rim portions of the blank are forced into each other during the welding operation, there is some tendency for the fused metal to be displaced outwardly, and this may cause the formation of an undesirable welding bead at the welded joint. It has been found that such bead formation can be controlled by beveling the ends of the rim portions in such manner as to leave space to receive this metal displaced during welding. Referring particularly to Figs. 7 to 9, Fig. 7 shows the ends of a blank 55 ready for welding. It will be noted that each rim portion 20 includes an end portion 60 substantially at right angles to its length and a portion 61 beveled with respect to its length and to the portion 60, this beveled portion being provided only on the inner corner at each end of each rim. The angle at which this beveled portion is formed and the amount of material removed in the beveling operation is preferably controlled to provide a triangular space capable of receiving slightly more metal than is likely to be displaced laterally when the ends 60 of the rim portions are welded together as described.

Thus referring to Fig. 8, which represents an intermediate position of the rim ends during welding, as indicated by the electrical connections, it will be noted that the portions 60 of each rim end flow into each other and at the same time a certain amount of metal from these abutting portions is displaced laterally as indicated at 65. The triangular space formed by the two beveled rim ends 61 is preferably at least sufficient in size to receive this displaced metal 65 and thus to avoid the formation of a laterally projecting welding bead. This desired capacity for the space 66 has been successfully obtained by beveling the edges 61 at an angle of substantially 45° to the length of the blank and with each leg of the removed triangular piece substantially equal to the thickness of the strip stock plus approximately 15% of the stock thickness.

Fig. 9 is an enlarged view of the rim ends after welding, and it will be noted that at the most only a small indentation 66 remains of the triangular space between the end portions 61 in Fig. 8, the balance of this space having been filled by the metal 65 displaced laterally during welding. It will also be noted in Fig. 9 that none of this displaced metal projects inwardly of the rim portions as a bead which might cause objectionable friction against the adjacent end of a roller in the pocket 22 bounded by the welded rim ends.

Figs. 10 to 14 illustrate apparatus for carrying out these punching, forming and shearing or severing operations to produce a blank 55 as described in connection with Figs. 5 and 6. The punch press shown fragmentarily at 70 includes a die-carrying slide 71 mounted for reciprocating movement with respect to the bolster plate 72 which supports the lower dies. The strip 50 of stock is shown as arranged to be advanced across the press by a feeding unit identified generally as 73 and including a pair of feed rolls 74 and 75 driven from the press by means such as a rocker arm 76 and pusher rod 77 to provide a step by step feed for the stock between working strokes of the press. The upper feed roll 75 is mounted in bearings 78 mounted for vertical movement in the feeding unit and normally held in contact with the stock by means of compression springs 79.

Figures 11, 12, 13, 14, 18, 19:
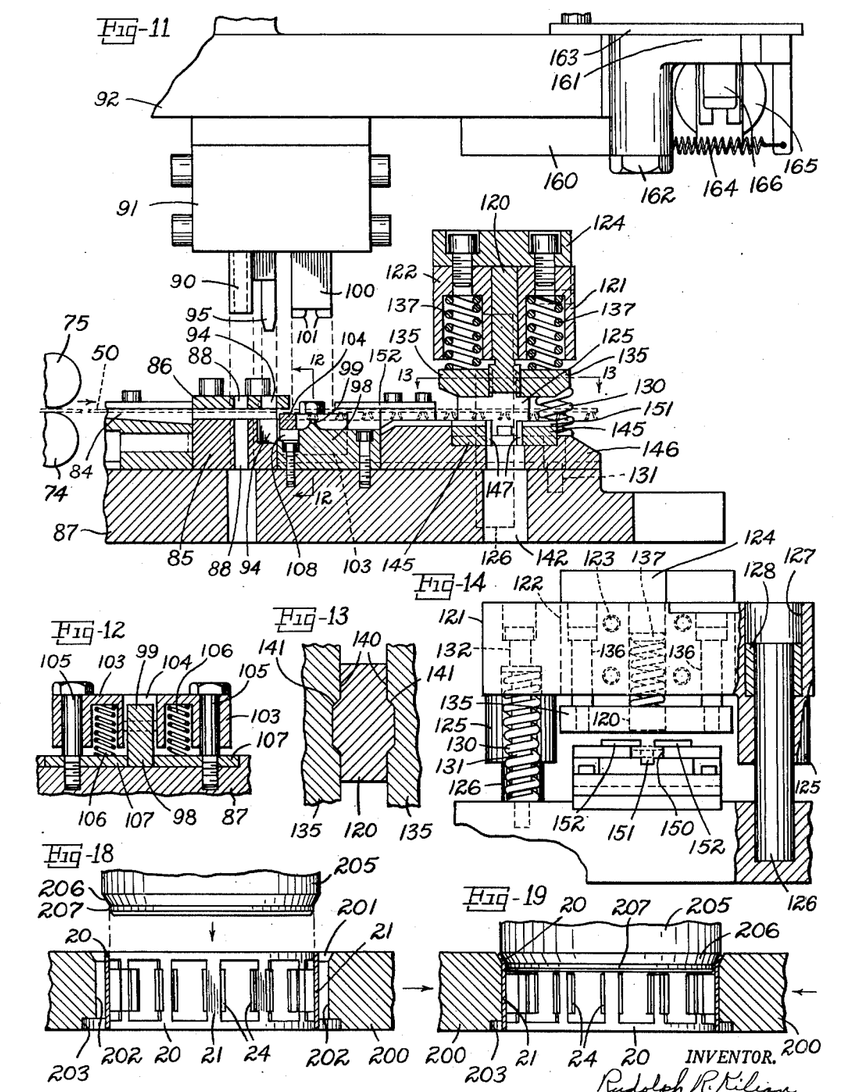
Fig. 11 is a somewhat diagrammatic view partly in side elevation and partly in vertical section of a portion of the apparatus shown in Fig. 10.
Fig. 12 is a sectional view taken substantially on the line 12—12 of Fig. 11.
Fig. 13 is a fragmentary sectional view of the shearing punch taken substantially on the line 13—13 of Fig. 11.
Fig. 14 is a view in end elevation of the shearing portion of the apparatus of Fig. 10.
Figs. 18 and 19 are somewhat diagrammatic views partly in elevation and partly in vertical section illustrating the construction and operation of the apparatus for flaring the retainer.

Referring to Figs. 10 and 11, the stock strip 50 passes from the feeding unit along a track member 84 to and between a block 85 and plate 86 carried by a base plate 87 supported by the bolster plate 72. The block 85 and plate 86 form lower or female die members, and they are provided with coincident I-shaped openings 88 adapted to receive a male blanking die member or punch 90 of complementary configuration for punching the I-shaped holes 51 shown in Fig. 5. This punch 90 is shown as carried by a clamp assembly or block 91 which is in turn secured to a plate 92 carried by the press slide 72.

The block 85 and plate 86 are also provided with coincident rectangular holes 94 which are adapted to receive a pilot member 95 carried by the clamping assembly 91 in spaced relation with the punch 90. This pilot member is of such dimensions as to fit accurately between the adjacent edges of a pair of lips 24 in the stock in order to center the stock accurately with respect to the blanking dies and also to the dies used in the forming operation on the lips. As shown in Fig. 11, the male forming die 98 is bolted to the plate 87, and includes an upwardly projecting tongue 99 which is adapted to cooperate with the complementary forming parts of the female die 100 carried by the clamp assembly 91. This female die 100 has its working parts curved at 101 about the radius of the rollers to be mounted in the finished retainer, as already described in connection with Fig. 4, to cooperate with the similarly curved parts of the tongue 99 for imparting the desired formation to the guiding surfaces 25 of the retainer lips.

Means are provided for supporting the stock above the tongue part 99 of the forming die during feeding and for disengaging the formed lips from this tongue. A generally U-shaped member is positioned adjacent the block 85 and includes two side portions 103 and a connecting bridge portion 104, these side portions 103 being arranged to straddle the male forming die 98 as shown in Fig. 11. Each side portion 103 is mounted for limited vertical movement on a shouldered bolt 105 mounted in base plate 87. In addition, each side portion 103 is partially bored out to receive a coil spring 106 mounted against a plate 107 secured to base plate 87 by one of bolts 105. The shouldered portions of bolts 105 are of such length, as shown in Fig. 12, as to permit member 103—104 to be raised normally by springs 106 to a position in which its bridge portion 104 is above the plane of the tongue 99 on die member 98. Thus between strokes of the press, the stock will ride on the bridge 104 to prevent engagement between the punched holes therein and the tongue 99. However, when the press slide descends, the punch 90 and die 100 will force the stock downwardly and will thus carry member 103—104 similarly downwardly against the pressure of its supporting springs 106, the die-member 98 being cut out at 108 to receive the bridge 104 as shown in Fig. 11. After the forming stroke is completed and the press slide rises, the springs 106 will raise member 103—104 upwardly, thus raising the formed lips above the tongue 99 and providing for further feeding of the stock in preparation for the next forming stroke of the press.

It will thus be seen that during each stroke of the press slide 71, the punch 90 and the forming die 100 descend together to carry out blanking and forming operations simultaneously at different positions on the strip. The feed rolls 74 and 75 are so geared and driven, as already described, as to advance the strip the proper distance between working strokes of the slide, in accordance with the conventional operation of progressive dies, but these rolls are released during the actual punching and forming stroke in order to permit the pilot member 95 to position the strip with the desired accuracy by entering a previously punched but unformed hole 51 in the strip, and thus while the strip is free, accurately centering it with respect to the die members 90 and 100 to assure accurate spacing of the roller pockets in the finished retainer. Thus referring to Fig. 10, the feeding unit 70 includes a lever or crank 110 operatively connected with the bearings 78 for feed roll 75 to raise these bearings against springs 79 when the lever is rotated in clockwise direction as viewed in Fig. 10. The slide plate 92 carries an arm 111 arranged to engage and depress lever 110 just before the dies engage the work and thus to effect the desired release of the feed rolls during the actual punching and forming operations.

Figs. 11, 13 and 14 illustrate means for severing a blank from the strip stock after the desired number of pockets have been punched and formed as described. A shearing punch 120 is mounted between two supporting members 121 and 122, which are bolted or otherwise secured together as indicated at 123 and provided with a common top member 124. The member 121 is formed with vertically extending channels for receiving the member 122 and the punch 120, and the resulting assembly is mounted for vertically reciprocating movement relative to the base plate 87. Referring to Figs. 11 and 14, the member 121 includes legs 125 on either side, and these legs are bored out to have sliding fit with a pair of guide posts 126 mounted in base plate 87 as shown in Fig. 14. The upper part of member 121 is counterbored at 127 to receive bushings 128 having sliding fit with guide posts 126, these bushings being force fit in the counterbores 127. In addition, the member 121 is hollowed at either side and adjacent the guide rods 126 to receive a coil spring 130 and a bolt 131 threaded at its lower end into the base plate 87. These bolts 131 have sliding fit at 132 in the upper portion of member 121 to provide for vertical sliding movement of member 121 with members 122 and 124 and the punch 120 against the pressure of springs 130, which normally hold the assembly in its upper position shown in Figs. 11 and 14, this upward movement of the assembly being limited by contact with the heads of the bolts 131.

The remainder of the upper part of the shearing die is formed by two plates 135 which act as blank holders for the shearing punch 120. Referring to Figs. 11 and 14, each of these plates 135 has sliding fit with the punch 120 and is mounted for limited vertical sliding movement with respect to the members 121 and 122. As shown, each plate 135 is in threaded engagement with the lower ends of a pair of shouldered bolts 136 mounted for sliding movement in member 121 or 122. Also, each member 121 and 122 is partially bored out to receive a coil spring 137 engaging the upper surface of the adjacent plate 135, these springs normally holding the plates 135 at their lowermost positions relative to the members 121 and 122, in which position they extend below the lower edge of the punch 120 as shown in Fig. 11. With this construction, when the member 121 and the other parts carried thereby are forced downwardly against the strip of stock, the plates 135 will engage the stock first to hold it firmly while the shearing punch 120 continues to descend to carry out the shearing operation.

Referring to Fig. 13, it will be noted that the shearing punch 120 includes cutting edges 140 arranged transversely of the direction of movement of the stock through the dies, and it also includes cutting edges 141 arranged at an angle to the cutting edges 140. It will accordingly be seen that this punch will carry out on the stock the severing operation indicated in dotted lines at 56 in Fig. 6, with the cutting edges 140 providing the straight ends 60 on the rim portions 20 and the angularly arranged cutting edges 141 similarly providing the beveled rim end portion 61. Since this operation requires the punching out of a complete web portion of the stock and parts of the rim portions connected therewith, the base plate 87 includes a hole 142 for receiving this punched out stock. In addition, the female parts of the shearing die are formed by two spaced plates 145 mounted in a supporting block 146 on the base plate, and these die portions 145 are provided with edges complementary with the cutting edges of the shearing punch 120, as indicated at 147 in Fig. 11. It will also be noted that the block 146 and die plates 145 are formed to provide a guiding track portion 150 for the stock, including a groove 151 for receiving the downwardly extending lips on the stock, and plates 152 overhang these grooves as shown in Fig. 14 for maintaining and guiding the stock in proper relation to the different parts of the die. A track 155 (Fig. 10) serves to convey the completed blank 55 away from the press.

It will be understood that the shearing punch 120 should be actuated only periodically and not on every stroke of the press, since blanks are cut from the stock only after the proper predetermined number of pockets have been punched and formed therein as described in connection with Fig. 6. Accordingly, the press is provided with operating means for the punch which will normally be inoperative but which will be controlled by a suitable counting mechanism so as to be actuated only at intervals when the proper number of pockets have been formed at the advancing end of the strip.

Referring to Figs. 10 and 11, the punch assembly is at such a height below the slide plate 92 that it will not come in contact with the slide on its down stroke. A bellcrank lever including arms 160 and 161 is mounted for rocking movement on the vertically arranged stud 162 carried by a plate 163 bolted or otherwise secured to the plate 92. The lever arm 160 is so arranged that it can be swung into a position between the plate 92 and the top 124 of the shearing punch assembly, in which position it will actuate the shearing punch on the down stroke of the slide. A coil spring 164 is arranged in such manner as to hold the lever arm 160 normally out of engageable position with the punch assembly. In order to swing the lever arm 160 into its operative position, means such as a solenoid 165 may be mounted on the press slide as shown in Fig. 11, with its plunger 166 so connected with the lever arm 161 that when the operating coil of the solenoid is energized, its plunger will swing the lever arm 161 in such direction as to move lever arm 160 against spring 164 and into operative position relative to the punch assembly. In the operation of the apparatus, a suitable counting mechanism 167 is connected with the press in such manner that it will energize the solenoid coil at intervals after the proper number of strokes of the press required for punching and forming the desired number of pockets in the strip. During the other strokes of the press, the solenoid will be deenergized, and the spring 164 will hold lever 160 in its inoperative position to prevent actuation of the shearing punch.

Figure 15:
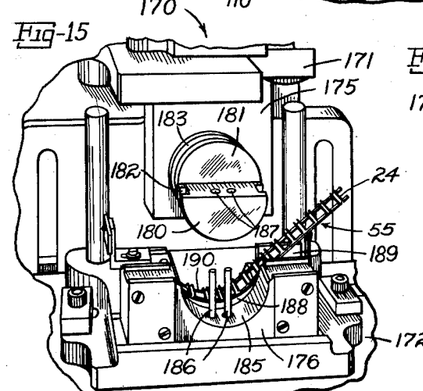
Figs. 15, 16 and 17 are perspective views illustrating the apparatus for forming the blank into cylindrical shape, these views illustrating different stages of the forming operation.
Figure 16:
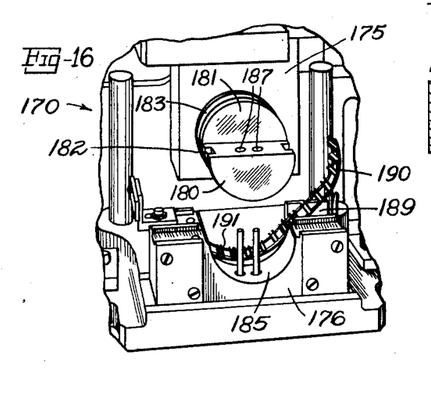
Figure 17:
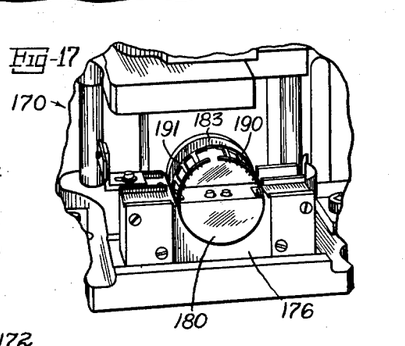

After the complete blank has thus been produced as described in connection with Fig. 6 and Figs. 10 to 14, it is formed into the proper cylindrical shape, and Figs. 15 to 17 illustrate apparatus for carrying out this forming operation. The punch press shown fragmentarily at 170 includes a reciprocating slide 171 and a bolster plate 172. The slide 171 carries the upper or male members of the forming die 175, and the plate 172 supports the female die unit 176. These dies are so constructed that they are effective to form a straight blank 55 into cylindrical shape in three successive steps.

Referring first to Fig. 15, it will be noted that the male die 175 includes a semi-cylindrical front portion 180 and a cylindrical rear portion 181, each of which is provided with a groove 182, 183, respectively, for receiving the lip portions 24 of the retainer blank. The female die unit 176 includes a semi-cylindrical front portion 185 adapted to receive the male die portion 180, and two guide pins 186 are mounted therein for cooperation with receiving bores 187 in male die portion 180. The female die unit also includes a cylindrically curved rear portion 188, but this portion 188 has an angular extent of only approximately 90° and the remainder of this part of the die is cut away as indicated at 189.

Fig. 15 shows the position of the parts following the first step of the forming operation. For this step, the blank 55 is inserted in the female die portion 188, and the press is operated to carry out a forming stroke of slide 171. The result of this stroke is to impart a cylindrical curve to a portion 190 at one end of the blank substantially equal to one-quarter of its total length, as a result of the 90° curvature of die portion 188, the remainder of the blank being received in the cutaway portion 189 of the die.

Following the step of Fig. 15, the blank is turned around, and its opposite end is inserted in die portion 188 and the press is again operated. Fig. 16 shows the position of the parts after completion of this second forming stroke, and it will be seen that a cylindrical curve has been imparted to the quarter portion 191 of blank 55 at the end opposite curved portion 190. The blank is then moved to the front of the female die unit and centered with respect to die portion 185, and the press is operated a third time. Fig. 17 shows the positions of the parts with the press at substantially lower dead center of this third forming stroke, and it will be seen that the semi-cylindrical die portions 180 and 185 have cooperated to impart a semi-cylindrical form to the intermediate portion of blank 55, thus bringing the ends of portions 190 and 191 together and completing the forming operation.

The formed blank is now ready for the welding operation, as already described in connection with Figs. 7 to 9. It has also been found advantageous to subject the welded blank to a case hardening treatment, such as a cyanide treatment, sufficient to produce a hardened surface to a depth of the order of approximately .002 to .003 inch. After hardening, the retainer is ready for the flaring operation in which the rim portions 20 are flared outwardly with respect to the web portions 21 as described in connection with Figs. 1 and 3, and Figs. 18 and 19 illustrate apparatus suitable for carrying out this operation.

Referring to Fig. 18, the retainer is first clamped within a cylindrical female die 200 of the desired inner diameter with which the web portions 21 are to conform in the finished retainer. This die includes two half portions pivotally connected together for clamping action, and it is flared outwardly at its upper end 201 at the desired angle to its cylindrical portion 202, for example an angle of the order of substantially 15°. The lower end of the die 200 is counterbored at 203 to receive one flared rim portion of a retainer during flaring of its other rim portion, as will be described. A male flaring die or punch 205 is mounted for reciprocating movement relative to the die 200, and it includes a tapered flaring portion 206 and a cylindrical pilot portion 207. The diameter of this pilot portion 207 is controlled to be substantially equal to the inner diameter desired for the web portions 21 of the finished retainer, and the axial length of the pilot portion is sufficiently short so that it will not come in contact with the lips 24 of the retainer during flaring.

Fig. 19 illustrates the flaring dies in their flaring relation. As shown, the male die or punch 205 has entered the retainer and its beveled portion 206 has formed the rim portions 20 outwardly to the desired flared shape. At the same time, the portions 27 of the webs 21 between lips 24 and rims 20 are gripped between the pilot portion 207 of the punch and the cylindrical wall 202 of the female die. In the next step of the flaring operation, the male die is lifted and the female die released, and the retainer is then turned over to flare its other rim portion. During this step, it will be seen that the rim portion already flared will be received within the counterbored portion 203 of the female die and will thus be protected during the other flaring operation.

This flaring operation and the resulting flared construction of the retainer afford substantial advantages in the practice of the invention, one of the most important being to add rigidity to the retainer as a whole and thus to increase its resistance to deformation under stress in handling and in operation. As a result, the finished retainer is found to possess rigidity substantially equal or superior to that of retainers formed of heavier stock without a peripheral flare or flange. At the same time, the light weight of the retainer of the invention minimizes the centrifugal force effective thereon in operation and thus correspondingly reduces stress thereon as compared with retainers of thicker and heavier stock.

Another advantageous result of the flaring operation is the substantial elimination of distortions such as often result from the cyanide or other hardening treatment. With the flaring dies of the construction shown in Figs. 18 and 19, the cylindrical pilot portion of the male die enters the retainer first and thus rounds it out before flaring begins. In addition, as described in connection with Fig. 19, this pilot portion also forces the outer ends of the web portions 21 to conform to the cylindrical portion 202 of the female die. Furthermore, the flaring of the rim portions has the additional effect of holding these web portions in the desired cylindrical alignment thus imparted to them by the pilot portion of the male die, providing a substantially permanent correction of such deformation as may previously have been presented. Still another advantage of flaring the rim portions following welding is that it provides a positive test of the strength of the welded joint, and if a weld is imperfect it will tend to break under the stress of flaring. Thus the welded portions of the rims serve as test sections for the retainer, and if the joints hold during flaring, this assures proper strength therein for the subsequent use of the retainer.

It is sometimes found that the diameter of the retainer after welding may vary from the desired dimension, such variation being due to one or more of several causes including accumulation of small pitch variations in the initial blanking and forming operations, variable stretch of the material during forming operations, and varying amounts of metal consumed in welding. The total of these variations is usually not large, for example within a range of plus 0.010 inch and minus 0.050 inch of the desired final diameter, but it may cause the retainer to be undesirably loose or tight in the finished bearing and is preferably corrected for as now described.

If the retainer is slightly too large, for example up to approximately 0.010 inch too large in diameter, the desired correction will be made during the flaring operation already described in connection with Figs. 18 and 19. When the female flaring die 200 is closed on the retainer under high pressure, the rim portions 20 will be squeezed to the desired diameter. Then when the male die 205 is operated, it causes the retainer rims to stretch outwardly and to set in their resulting flaring condition, thus holding the remainder of the retainer to the desired final diameter. It should also be noted that the flaring operation tends to produce some reduction in the width of the pockets 22 in the retainer but with the initial width of the pockets controlled as stated to provide a clearance of from .006 to .008 or .010 inch at each end of the roller, this reduction will not undesirably affect the proper running clearance for the rollers.

Figure 20:
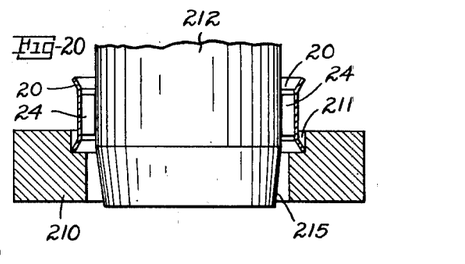
Fig. 20 is a view similar to Figs. 18 and 19 illustrating apparatus for expanding the retainer to a desired final diameter.

If the retainer is slightly too small, for example up to approximately 0.050 inch too small in diameter, it may be stretched to the desired final diameter without loss of its other properties, and Fig. 20 shows apparatus suitable for such a stretching operation. The undersized retainer is supported in an annular female die 210 provided with an internal shoulder or counterbore 211 of approximately the desired outer diameter for the retainer. A cylindrical male die or punch 212 is mounted for reciprocating movement with respect to die 210, and it includes a tapered pilot portion 215 at its lower end. The punch 212 is of such diameter that when it is inserted in the retainer, it will engage the inner edge of lips 24 and act through these lips to expand the rim portions 20 to the desired final diameter.

When all the above operations are completed as described, the retainer will have the appearance shown in Fig. 1 and the characteristics described in connection therewith, and it will be ready for assembly in a complete bearing as shown in Figs. 2 and 3. The retainer will be light in weight but will possess rigidity adequate to resist deflection or deformation incident to normal stresses in handling and use. In addition, the lips of the retainer form guiding surfaces of substantial area for the rollers effective to minimize cocking or wobbling of the rollers or other relative movements in the bearing tending to create friction, thus promoting a long useful life for the bearing. It will also be apparent that these retainers can be readily produced at low unit cost in any desired sizes to fit bearings and rollers of any length and diameter, by suitable control of the relative sizes and spacing of the dies shown in Figs. 10 to 20.

While the method, article and apparatus herein described constitutes preferred embodiments of the invention, it is to be understood that the invention is not limited to this precise method, article and apparatus, and that changes may be made therein without departing from the scope of the invention which is defined in the appended claims.

What is claimed is:

1. The method of manufacturing a retainer of predetermined circumference for a roller bearing which includes the steps of punching spaced holes in a strip of sheet metal to form a blank having rim portions connected by spaced web portions defining pockets therebetween for the reception of rollers and with said rim portions extending at each end beyond the adjacent one of said web portions, forming said blank into cylindrical shape, autogenously welding together the abutting ends of said rim portions under controlled conditions of heat and pressure providing said predetermined circumference after said welding, and then flaring said rim portions radially outwardly relative to said web portions to stiffen said retainer and to assure a substantially cylindrical configuration throughout said web portions.

2. The method of manufacturing a retainer of predetermined circumference for a roller bearing which includes the steps of punching spaced holes in a strip of sheet metal to leave rim portions connected by spaced web portions defining pockets therebetween for the reception of rollers, periodically severing said strip to form blanks each including a predetermined number of said web portions equal to the number of said pockets to be provided in the completed retainer, said severing operation being performed simultaneously at either side of the web portion in said strip adjacent said severed blank and at points equally spaced from said web portion but closer thereto than to the web portions on either side thereof to leave the rim portions of said blank with their lengths in predetermined excess of said predetermined circumference for said completed retainer, beveling one corner of each of the resulting severed ends of said rim portions simultaneously with said severing operation, forming said blanks into cylindrical shape, autogenously welding the abutting ends of the rim portions of each said blank under conditions of heat and pressure providing for reduction of the length of each said rim portion to substantial equality with said predetermined circumference and for displacing said excess length of metal into said beveled corners, and then flaring said welded rim portions radially outwardly relative to said web portions to stiffen said retainer and to maintain said predetermined circumference and cylindrical shape through said web portions.

3. The method of manufacturing a retainer of predetermined circumference for a roller bearing which includes the steps of punching spaced holes in a strip of sheet metal to leave rim portions connected by spaced web portions defining pockets therebetween for the reception of rollers, severing said rim portions from the remainder of said strip at points spaced between adjacent web portions such that the length of each said rim portion is in predetermined excess of said predetermined circumference for the completed retainer, forming said severed strip into cylindrical shape, autogenously welding together the abutting ends of said rim portions under conditions of heat and pressure providing for reduction of said length of said rim portions to substantial equality with said predetermined circumference, and then flaring said rim portions radially outwardly relative to said web portions to stiffen said retainer and to maintain said predetermined circumference and cylindrical shape through said web portions.

4. A roller bearing retainer of the character described formed from a flat strip stock and comprising a pair of axially spaced coaxial rim portions, a plurality of web portions connecting said rim portions and defining a cylindrical shape, said web portions being angularly spaced to form pockets therebetween for the reception of rollers, said rim portions being flared in radially outwardly diverging relation with respect to said web portions at a relatively small angle with respect to the central axis of said retainer to stiffen said retainer in said cylindrical shape, each said rim portion having the ends thereof autogenously welded together in abutting relation and with the welded joint therebetween flared integrally with the remainder of said flared rim portion, and lips on said web portions formed inwardly thereof to provide guiding surfaces for rollers in said pockets.

5. In a roller bearing including an inner and outer race and a plurality of rollers positioned between said races, a retainer formed from flat strip stock and comprising a pair of axially spaced coaxial rim portions, a plurality of web portions connecting said rim portions and defining therewith a cylindrical shape, said web portions being angularly spaced to form pockets therebetween for the reception of said rollers, the diameter of said retainer measured across said web portions being approximately equal to the diameter of a circle passing through the centers of all of said rollers, said rim portions being flared radially outwardly relative to the adjacent ends of said web portions through a relatively small angle with respect to the central axis of said retainer to stiffen said retainer and to maintain said cylindrical shape thereof through said web portions, each said rim portion having the ends thereof autogenously welded together in abutting relation and with the welded joint therebetween flared integrally with the remainder of said flared rim portion, lips on said web portions formed radially inwardly thereof to provide cylindrically curved guide surfaces for said rollers, the radius of curvature of said guide surfaces being substantially equal to the radius of said rollers, and said webs being angularly spaced by an amount sufficient to provide guiding clearance between each said roller and the adjacent pair of guiding lip surfaces.

RUDOLPH R. KILIAN.

(References on following page)

REFERENCES CITED

The following references are of record in the file of this patent:

UNITED STATES PATENTS

| Number | Name | Date |
|---|---|---|
| 1,173,719 | Hirth | Feb. 29, 1916 |
| 1,446,487 | Timken | Feb. 27, 1923 |
| 1,598,025 | Stevens | Aug. 31, 1926 |
| 1,794,188 | Leis | Feb. 24, 1931 |
| 1,849,944 | Medville | Mar. 15, 1932 |
| 1,872,384 | Andren | Aug. 16, 1932 |
| 1,894,595 | Mitchell | Jan. 17, 1933 |
| 1,940,124 | Gibbons | Dec. 19, 1933 |
| 2,016,923 | Hermann | Oct. 8, 1935 |
| 2,038,474 | Brown | Apr. 21, 1936 |
| 2,038,475 | Brown | Apr. 21, 1936 |
| 2,112,754 | Annen | Mar. 29, 1938 |
| 2,122,365 | Beck | June 28, 1938 |
| 2,201,316 | McGee | May 21, 1940 |
| 2,294,289 | Frauenthal | Aug. 25, 1942 |